Feb. 15, 1927.
R. F. SERGEL ET AL
1,617,772
EDUCATIONAL CARD GAME
Filed Feb. 20, 1926
Fig. 1ᵃ 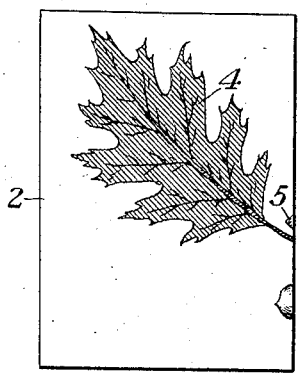 Fig. 1ᵇ 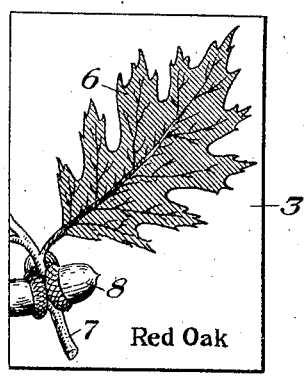
Red Oak
Fig. 2ᵃ 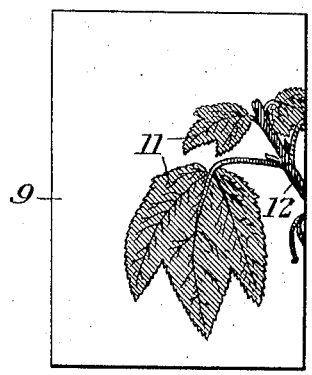 Fig. 2ᵇ 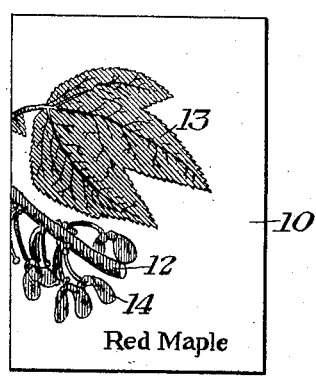
Red Maple
Fig. 3ᵃ 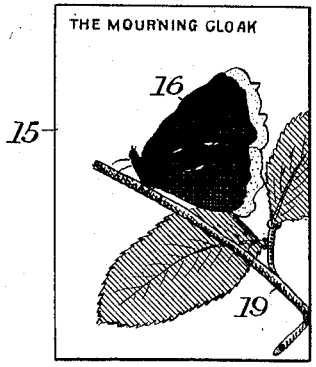 Fig. 3ᵇ 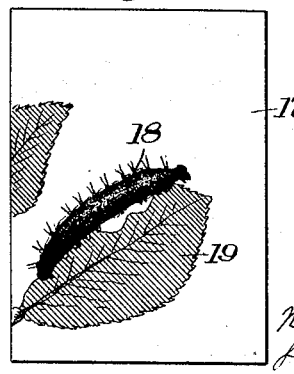
INVENTORS
Ruth F. Sergel
Linda H. Meyers
by their attorneys
Byrnes, Stebbins & Parmelee Patented Feb. 15, 1927.

1,617,772

UNITED STATES PATENT OFFICE.

RUTH F. SERGEL AND LINDA H. MEYERS, OF PITTSBURGH, PENNSYLVANIA.

EDUCATIONAL CARD GAME.

Application filed February 20, 1926. Serial No. 89,662.

This invention relates to card games, and particularly to a card game having certain features of educational value by means of which the players may be familiarized with natural objects.

The game of the present invention is designed primarily for children. It has for its object to provide a card game wherein the cards bear pictorial representations of different natural objects, so that, as the players play the game, they become familiarized with the picture representations on the cards and are thereby educated to recognize and distinguish different natural objects from other objects of the same general class and to associate them with forms related thereto.

It is proposed, according to the present invention, to provide the cards with pictorial representations of natural objects of biological interest. The cards may, for instance, have representations of the foliage of different trees and their fruits, the term "fruits" hereinafter being used in its generic sense to designate any fruit or seed pod, nut, or the like, or any seed or grain. It is also proposed that in place of pictorial representations of objects of the vegetable kingdom that pictorial representations of different but related forms of animal life be depicted.

The invention may be readily understood by reference to the accompanying drawings, wherein:

Figures 1ᵃ and 1ᵇ represent a pair of complementary cards such as are used in the game;

Figures 2ᵃ and 2ᵇ represent another pair of complementary cards which embody the present invention; and Figures 3ᵃ and 3ᵇ represent another pair of cards, illustrating a butterfly and its larvæ, respectively.

The cards shown in the accompanying drawings are merely representative of pairs of cards chosen from a deck of any suitable number. The deck is comprised of a plurality of pairs of cards, and each card of each pair bears some pictorial representation complementary to the pictorial representation of the other card of the pair but having no relation to any of the remaining pairs of cards in the deck.

In Figures 1ᵃ and 1ᵇ, 2 designates one of two cards of a pair, and 3 designates the other of two complementary cards. The card 2 bears a pictorial representation of the leaf of a red oak tree, as indicated at 4, together with a very small portion 5 of a twig of the oak. The card 3 may also bear a full or partial representation of the leaf of a red oak, as indicated at 6, as well as a full showing of the stem of the twig, as at 7, together with a cluster of acorns which are the fruit of the red oak. The acorns on the card 3 are designated 8.

In like manner, Figures 2ᵃ and 2ᵇ show complementary cards 9 and 10. Card 9 shows fully the leaf of a red maple, as indicated at 11, and a portion of the stem of a twig of red maple, as indicated at 12. On card 10 is shown the remaining portion of the stem of the twig 12, as well as another leaf designated 13, and clusters of seed pods 14, these seed pods being the fruit of the red maple.

In like manner, a large deck of cards may be made up of pairs, one card showing fully the foliage of a tree or plant, and the other card showing the fruit of the tree or plant together with a twig or stem structure by means of which the two cards may be matched up when laid side by side to form a complete picture. The cards in the deck are so arranged that it is not possible for the twig portion of one card to be matched up with the twig portion of any other card except the card with which it is naturally related so that the game is played by making up books, each book comprising a pair of complementary cards.

As preferably arranged only one card of each pair bears a title designation. The card 3 of Figure 1ᵇ bears a designation as does the card 10 of Figure 2ᵇ. It is preferred that the title designation be on that card which shows the fruit.

In playing the game, the cards are arranged in a pack on the playing table. The players take turns in turning over a card from the stack and trying to match it with a card previously turned over. The player matching the greatest number of pairs is the winner. As the only designations for the cards are the pictorial representations and the accompanying title or botanical designation, the players soon become familiar with the appearance of different trees and their fruits and are readily enabled to distinguish the foliage of one tree from the foliage of another tree. They are also enabled to distinguish the fruits of the different trees and plants.

It will be obvious that instead of using trees and their fruits, that the cards might show grains and grasses of different kinds with their seeds, or that they might show insects and their larvæ so that various interesting and instructive combinations can be secured.

In the form of game illustrated in Figures 3ª and 3ᵇ, there is shown a game wherein the objects pictured on the cards are different but related forms of insect life. In Figure 3ª, 15 designates a card having a picture 16 of a butterfly of a certain kind thereon, together with its name. On the card 17 of Figure 3ᵇ, there is the caterpillar 18 from which the butterfly of Figure 3ª develops. The twig which forms the principal food for this particular caterpillar is common to both cards, and is designated 19.

It will be seen that the game consists not merely in matching up complementary parts of a picture, but it includes the novel idea of matching a fruit with its foliage or tree, or matching any natural object to some other different object to which it is naturally related.

We claim as our invention:

1. A deck of cards comprised of a plurality of pairs, each card of a pair having a pictorial complement of the other, and an additional pictorial representation on one of the cards not found on the other bearing a natural relation to the pictorial matter common to both cards.

2. A deck of cards comprised of a plurality of pairs, each card of a pair having a pictorial complement of the other adapted to illustrate a natural object, an additional pictorial representation on one of the cards not found on the other but bearing a natural relation to the pictorial matter common to both cards, and a title on one of the cards only.

3. A deck of cards comprised of a plurality of card groups, each card of a group having a pictorial complement to another card of the group, and a further pictorial representation on one of the cards not found on another and bearing a natural relation to the pictorial subject matter common to the entire group.

4. A card game including a deck having a plurality of pairs of cards, each card of a pair having a pictorial complement to the other card of the pair and distinguishable from the cards of all other pairs, one of the cards only of each pair having a further pictorial illustration of an object having a natural association with the pictorial matter common to the pair.

5. A card game including a deck of cards in which there are a plurality of pairs of cards, each card of a pair bearing a botanical representation complementary to the representation of the other card of the pair, the representation of one card of each pair being that of foliage and the representation on the other card being that of a natural product related to the foliage.

6. A card game including a deck of cards in which there are a plurality of pairs of cards, each card of a pair bearing a botanical representation complementary to the representation of the other card of the pair, the representation of one card of each pair being that of foliage and the representation on the other card being that of a natural product related to the foliage, the representation being so arranged that when the cards of each pair are laid adjacent each other, an illustration of a plant form and product is obtained.

7. A card game including a deck of cards in which there are a plurality of pairs of cards, each card of a pair bearing a botanical representation complementary to the representation of the other card of the pair, the representation of one card of each pair being that of foliage and the representation on the other card being that of a natural product related to the foliage, one of the cards of each pair only bearing a title designation.

8. A card game comprised of a deck of cards in which there are a plurality of related pairs of cards, both cards of each pair showing different but naturally related biological subjects, and complementary subject matter on cards of each pair to facilitate the matching thereof.

9. A card game comprised of a deck of cards in which there are several pairs, one card of each pair showing a pictorial representation of a different form of an object naturally related to an object pictured on the other card of the pair, and other complementary matter common to each card.

In testimony whereof we have hereunto set our hands.

RUTH F. SERGEL.
LINDA H. MEYERS,